Patented June 26, 1945

2,379,381

UNITED STATES PATENT OFFICE 2,379,381

COMPOSITION OF MATTER

Robert S. Shelton, Mariemont, and Marcus G. Van Campen, Jr., Silverton, Ohio, assignors to The Wm. S. Merrell Company, Reading, Ohio, a corporation of Delaware No Drawing. Application April 9, 1941, Serial No. 387,614

9 Claims. (Cl. 260—469)

This invention relates to certain new esters of amino-diols which are of value as anti-spasmodic agents, having both an action directly on smooth muscles as well as an inhibitory action on parasympathetic endings, that is, having an action like that of papaverine as well as an action like that of atropine. Most of the new compounds have a predominant papaverine-like action, although in some the atropine-like action predominates; and naturally, the degree of activity of the compounds varies to a considerable extent. The new compounds have a relatively low toxicity and are quite free from side reactions as compared, for example, with atropine.

The new compounds of the invention are carboxylic acid esters of amino-diols represented by the general formulae

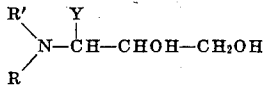

or

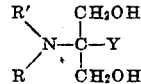

in which R and R' represent alkyl groups, and Y represents hydrogen or a methyl group, or in which the group NRR' may be a piperidino or similar cyclic amino group.

Both the mono-esters and the di-esters of the amino-diols are included in the invention, although the mono-esters in general are markedly superior to the di-esters, and have important advantages thereover.

The esters may be the esters of various carboxylic acids, such as aliphatic carboxylic acids, for example those having around 6 to 15 carbon atoms in the carbon chain linked to the carboxyl group, for example, acids such as dialkyl acetic acids of the formula $R_1R_2CHCOOH$ where $R_1$ is an n-alkyl or n-alkenyl group having from 3 to 7 carbon atoms and $R_2$ is an ethyl group or an n-alkyl or n-alkenyl group having from 3 to 7 carbon atoms, for example, ethylbutylacetic acid; or alkylcycloalkylacetic acids such as those of the formula $R_3R_4CHCOOH$ where $R_3$ is a cyclohexyl group and $R_4$ is an ethyl, n-propyl, n-butyl, n-butenyl, or allyl group; or acids such as trialkylacetic acids of the formula

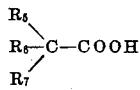

where $R_5$, $R_6$, and $R_7$ are n-alkyl or n-alkenyl groups having from 2 to 4 carbon atoms; but advantageously the acids are of the aralkyl type having an aryl group linked to the carboxyl group through an aliphatic group such as phenylacetic acid, di-phenylacetic acid, dibenzylacetic acid, phenyl cyclohexylacetic acid, hydrocinnamic acid, $\alpha,\beta$-di-phenyl propionic acid, $\alpha$-phenyl butyric acid, $\alpha$-phenyl valeric acid, etc.

Most of the new esters, in the form of the free base, are oils, which are non-distillable, and are conveninently purified by conversion to a crystalline salt which may be purified by crystallization. Most salts of the bases are crystalline, and if the compounds are purified as the salt, they are readily converted to the free base form by treatment with sodium bicarbonate or other alkali.

The new compounds are readily prepared by treating the amino-diols with the acid chloride of the carboxylic acid in the presence of a suitable esterifying agent, such as sodium carbonate. If slightly more than one equivalent of the amino-diol is used for each equivalent of acid chloride, the mono-ester is produced, while if slightly less than one mole of the amino-diol is used for two moles of the acid chloride, the di-ester is produced.

The invention will be further illustrated by the following specific examples, but it is not limited thereto.

*Example 1.* — 1-dibenzylacetoxy-2-hydroxy-3-di-n-butylamino propane. One-tenth of a mole of 1,2- di-hydroxy-3-di-n-butylamino propane is dissolved in about 250 parts of benzol, and the solution is dried by distilling off 20 to 30 parts of the benzol. 0.16 mole of anhydrous sodium carbonate are added. The mixture is then stirred continually and kept at 15–20° C. while adding about 0.09 to 0.095 mole of dibenzylacetyl chloride over a period of about one-half hour. Stirring is continued for another half hour at the end of which around 100–125 parts of cold water are slowly added. The upper benzol layer is then separated, washed several times with 100 part portions of cold water, and the benzene finally removed by distillation under vacuum, giving a viscous oil which constitutes the crude ester. This ester is treated with an equimolar quantity of an acid, to convert it to a crystallizable salt. Satisfactory acids for this purpose are hydrochloric acid, thymolsulfonic acid, and oxalic acid, although other acids may be used. After conversion to the salt, the product is dissolved in acetone or ether and the solution chilled, after which the precipitated salt is recrystallized from acetone. The resulting salt is readily converted to the free base by treatment with an excess of saturated sodium bicarbonate solution and shaking the basic ester out with ether or other solvent. The resulting ether solution may be dried over sodium sulfate, evaporated, and the residual oil dried in vacuum over sulfuric acid to give the pure ester in the form of the free base.

The compound as a free base is an oil. Its hydrochloride is a crystalline solid, melting point 79–81° C. and is water-soluble. This compound is very active, producing marked relaxations of smooth muscles at extreme dilution. It reduces spasms produced by either barium chloride or acetylcholine, thus having action similar to that of atropine as well as action similar to that of papaverine. The latter predominates. The toxicity of this compound is relatively low.

*Example 2.* — 1-dibenzylacetoxy-2-hydroxy-3-diethylamino propane. This compound was prepared by the procedure described in Example 1, using the corresponding amino-diol. In the form of a free base, it is an oil. It forms a hydrochloride which is a crystalline solid, melting point 134° C., which is water-soluble. It is a little more toxic than the compound of Example 1, and its therapeutic properties resemble those of the compound of Example 1, although it is somewhat less active.

*Example 3.* — 1,2-bis-phenylacetoxy-3-piperidino propane. This compound was prepared following the procedure of Example 1, using, as the amino-diol, 1,2-dihydroxy-3-piperidino propane and as the acid chloride, phenylacetyl chloride, and somewhat more than two equivalents of the acid chloride being used for each equivalent of amino-diol. The free base is an oil. The oxalate is a crystalline salt, melting point 147–148° C. This compound is considerably less toxic than the compound of Example 1, but its activity although similar to that of the compound of Example 1, is also considerably less.

*Example 4.* — 1-dibenzylacetoxy-2-hydroxy-3-piperidino propane. This compound was prepared by the procedure described in Example 1, using dibenzylacetyl chloride and 1,2-dihydroxy-3-piperidino propane. The compound in the form of a free base is an oil. Its hydrochloride is a crystalline solid, melting point 132–134° C., and is water-soluble. The compound has about the same toxicity as that of Example 2, and is of value for preventing spasms either of the type produced by barium chloride or the type produced by acetylcholine. The papaverine-like action is considerably greater than the atropine-like action.

*Example 5.* — 1-dibenzylacetoxy-2-methyl-2-diethylamino-3-hydroxy propane. This compound was prepared by the procedure of Example 1, using dibenzylacetyl chloride and 1-hydroxy-2-methyl-2-diethylamino-3-hydroxy propane. It is, in the form of the free base, a crystalline solid melting at 52° C. Its hydrochloric acid salt was isolated as an oil. This compound has about the same toxicity as that of Example 2, and has a therapeutic activity similar to that of the compound of the preceding example.

*Example 6.* — 1-ethylbutylacetoxy-2-hydroxy-3-diethylamino propane. This compound was prepared as in Example 1, using ethylbutylacetyl chloride and 1,2-di-hydroxy-3-diethylamino propane. In the form of a free base, it is a pale yellow oil. It forms a thymolsulfonate which is a crystalline solid melting at 55° C. and which is quite hygroscopic. It is somewhat less toxic than the compound of Example 1, and, while somewhat less active, has the same general therapeutic properties, with a somewhat more pronounced papaverine-like action.

*Example 7.* — 1,2-bis-ethylbutylacetoxy-3-diethyl-amino propane. This compound was prepared as in Example 3, using ethylbutylacetyl chloride and 1,2-dihydroxy-3-diethylamino propane. The compound in the form of the free base is a viscous oil. Its thymolsulfonate is a crystalline material melting at 77° C. which is soluble in water. This compound, while less toxic than the compounds of the previous examples, is also less effective therapeutically.

*Example 8.* — 1,2-bis-phenylacetoxy-3-di-n-butylamino propane. This compound was prepared as in Example 3, using phenylacetyl chloride and 1,2-dihydroxy-3-di-n-butylamino propane. As the free base, it is an oil. Its oxalate is a crystalline solid. This compound is less toxic than any of those of the preceding examples, and its therapeutic activity is fairly good. The papaverine-like action predominates.

*Example 9.* — 1-ethylbutylacetoxy-2-hydroxy-3-piperidino propane. This compound was prepared as in Example 1, using ethylbutylacetyl chloride and 1,2-dihydroxy-3-piperidino propane. The free base is a viscous oil. The hydrochloride is crystalline, melting at 100° C. The toxicity of the compound is somewhat less than that of the compound of Example 1. It has definite therapeutic activity in reducing spasms, both of the type induced by barium chloride and the type induced by acetylcholine, but with this compound, the atropine-like action is greater than the papaverine-like action.

Other compounds, having definite therapeutic value include within the scope of the invention, and readily prepared by the procedures outlined above, include 3-phenylacetoxy-2-hydroxy-1-diethylamino propane, free base an oil, thymolsulfonate a crystalline solid, melting point 133° C.; 1-ethylbutylacetoxy-2-hydroxy-3-di-n-butylamino propane, free base an oil, thymolsulfonate a crystalline compound, melting point 80° C.; 1-phenylacetoxy-2-hydroxy-3-piperidino propane, crystalline hydrochloride, melting point 124° C.; 1,2-bis-phenylacetoxy-3-diethylamino - propane, free base a viscous oil, thymolsulfonate a crystalline solid, melting point 59° C., oxalate a crystalline solid; and others, including the tropic acid salts of the various amino-diols, as well as the esters of the amino-diols with other carboxylic acids, particularly the carboxylic acids having an aryl group linked to the carboxylic group through an aliphatic group, such as toluic acid, hydratropic acid, tolylacetic acid, etc.

In general, as pointed out above, the mono-acid esters are superior to the di-esters, and the esters of carboxylic acids containing aryl groups have important advantages over the esters of other acids, such as the aliphatic carboxylic acids.

We claim:
1. Esters of (1) amino-diols selected from those having the formulae

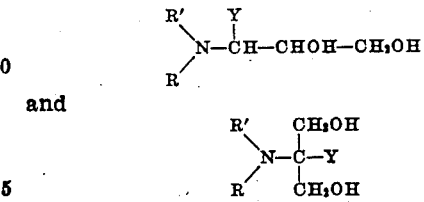

and in which Y is selected from the group consisting of hydrogen and a methyl group, and NRR' is selected from the group in which R and R' are alkyl groups and in which NRR' is a cyclic amino group with (2) carboxylic acids in which the carbon atom of the carboxy group is linked to a carbon atom.

2. Compounds as in claim 1, in which the carboxylic acid has at least one aryl group linked to the carboxyl group through an aliphatic group.

3. Compounds as in claim 1, in which the esters are mono-esters.

4. Compounds as in claim 1, in which the esters are mono-esters and the carboxylic acid has at least one aryl group linked to the carboxyl group through an aliphatic group.

5. Compounds as in claim 1, in which the esters are mono-esters and the carboxylic acid is dibenzylacetic acid.

6. 1-dibenzylacetoxy-2-hydroxy-3-di-n-butylamino propane.

7. 1-dibenzylacetoxy-2-hydroxy-3-diethylamino propane.

8. 1-ethylbutylacetoxy-2-hydroxy-3-diethylamino propane.

9. Compounds as in claim 1 in which the carboxylic acid is an aliphatic carboxylic acid having from 6 to 15 carbon atoms in the carbon chain linked to the carboxyl group.

ROBERT S. SHELTON.
MARCUS G. VAN CAMPEN, Jr.